Patented Dec. 28, 1926.

1,612,780

UNITED STATES PATENT OFFICE.

JAMES H. REEL, OF NEW YORK, N. Y., ASSIGNOR TO GENERAL RUBBER COMPANY, OF NEW YORK, N. Y., A CORPORATION OF NEW JERSEY.

METHOD OF TREATING RUBBER AND THE LIKE AND THE PRODUCTS OBTAINED THEREBY.

No Drawing.      Application filed June 20, 1924. Serial No. 721,311.

This invention relates to methods of treating rubber and the like and to the products obtained thereby, and has for its principal object, to produce by simple and efficient methods, grades of rubber or similar material of higher degrees of purity than have heretofore been produced.

There are several well-known methods of preparing dry rubber from latex wherein the rubber is produced in the form of a compact mass either as sheets or blocks and is afterwards subjected to a washing process. As an instance of this may be mentioned plantation rubber which is coagulated by an acid or heat process in the form of sheets and is thereafter washed on a washing mill by applying a continually flowing stream of water while the rubber is being milled and thereafter dried.

When the latex is coagulated to produce the rubber it contains various non-rubber constituents, some of which are readily soluble in water, while others are insoluble in water but may be rendered soluble by suitable treatment or dissolved out by other suitable solvents. Instances of water-insoluble non-rubber ingredients are protein and resin, the protein being made readily soluble by digesting with proteolytic enzymes such as papain or trypsin, and the resin being readily soluble in acetone or alcohol. It is not known that these non-rubber ingredients have ever been removed from the crude plastic rubber to such a degree of completeness as to render the rubber substantially pure. The fact is that the non-rubber constituents are so thoroughly imprisoned in the compact mass forming the crude rubber sheet or block that it is practically impossible to reach them with the solvents to effect their removal to any substantial degree of perfection.

I have found that if the dry rubber is in a sufficiently open or uncompact condition it can be successfully subjected to a thorough washing treatment with water and to treatments with various other solvents and reagents, and thereby remove substantially all of the non-rubber constituents, grades of rubber being thus produced of far greater purity than has been possible to attain heretofore.

My invention is not confined to any particular way of producing the dry rubber from the latex provided it is attainable in a sufficiently open or uncompact condition for successful treatment by the reagents and solvents employed. Broadly considered the invention comprises the method or methods of treating the rubber in a substantially open or uncompact form with one or more suitable solvents and a reagent or reagents when desired for removing non-rubber constituents therefrom and the production thereby of a product or products of far greater purity from a standpoint of the elimination of such constituents, than has been heretofore possible to produce.

With the above intended breadth of invention in view, the invention therefore contemplates washing the uncompact rubber with water to remove the water-soluble non-rubber constituents; or treating the non-compact rubber with a solvent for removing the protein present, preferably by treating it with water and a reagent rendering the protein soluble in water, such as a proteolytic enzyme, as for instance papain or trypsin; or treating the non-compact rubber with a solvent for removing the resin present, such as acetone or alcohol; or subjecting the non-compact rubber to any number of these treatments, thereby producing a rubber in any instance of greater purity than has heretofore been possible.

As before stated the invention comprises treating rubber in an open or uncompact form, and to this end in the preferred embodiment the treatment is applied to crude rubber produced from latex prepared by what is known as the "spray method." An apparatus suitable for so producing rubber is shown in the patent to C. E. Bradley, et al., No. 1,428,526. Here the latex is sprayed into a chamber provided with a suitable heated current of air or other drying medium for drying out the liquid content of the latex, the solid content remaining in the form of comminuted material which falls to the floor of the receptacle where it is collected and finally removed. The rubber particles as they fall to the floor collect into the form of an open uncompact spongy mass.

In the carrying out of my invention the mass of dry rubber in its uncompact spongy state is subjected to a washing treatment with water. This may be carried out either in the chamber or after it has been removed therefrom, but preferably by injecting sprays of water in the chamber below the point where the latex has become dried. The sprays of water will thus strike the separate particles of the dried latex as they are falling like snow toward the floor and they will thereby be subjected to a preliminary washing treatment even before they have collected into the open sponge-like mass. The washing however is preferably continued by permitting the water spray acting on the falling particles, to also act upon the spongy mass collecting on the floor and to add other streams of water thereto if desired, provision being made for carrying the water off that has acted upon the rubber as fresh water is added. By this process substantially all of the water-soluble non-rubber constituents, which usually comprise from 10-13% of the entire mass, are removed. After drying the rubber a product is obtained far purer, as far as the removal of the water-soluble non-rubber constituents is concerned, than has heretofore been produced.

If it is desired to remove the protein, the spongelike mass or falling particles is subjected to a suitable treatment which may be similar to that previously mentioned. Likewise, if it is desired to remove the resin constituent, the rubber is similarly treated with a suitable solvent such for instance as those already mentioned. I have obtained very satisfactory results by treating the washed uncompact spongelike rubber with a water solution of a proteolytic enzyme (for example papain 1 part to 100 parts of rubber), and after washing and preferably drying, again treating the uncompact mass with cold acetone after which it is dried. While the rubber may be subjected to only one of these treatments it will usually be desirable to subject it, for most uses, to all three treatments thereby securing a rubber of the highest purity.

The treatments may be performed consecutively and the rubber washed between each treatment to remove the dissolved non-rubber constituents, and their solvents as may be desired, the final product being subjected to a drying process and it is desirable to dry the rubber after each treatment. The rubber in its spongy state is capable of being dried more perfectly than has been possible heretofore with the rubber in the form of a compact sheet or block. The drying is performed also in less time, and at a lower temperature, thereby producing, not only a purer rubber, but a higher grade of rubber having high tensile strength on account of maintaining a greater portion of the original nerve of the rubber than is possible where the higher temperatures are employed necessary to dry the rubber in slab or block form.

A further advantage of washing rubber that has been formed by the spray method resides in the fact that the dry rubber so formed contains more water-soluble non-rubber constituents than does rubber coagulated in the usual way by an acid or prolonged heating process, which renders part of the water-soluble material insoluble.

The washing of the rubber in the spray chamber before referred to may continue during the whole period of the run and even thereafter while the unit is cooling down prior to the removal of the rubber, although of course the rubber may be removed from the chamber as a continuous operation. The rubber so washed is allowed to drain and the draining is preferably accelerated by carefully removing a great portion of the water in a centrifuge equipped with a basket similar to that used in laundries. It is then dried at a temperature of 100-120° F. or lower in the spongelike form and can thus be dried to a moisture content of less than .2% moisture.

In preparing rubber by the spray method the heated air or other gas used in coagulating the spray passes from the chamber carrying with it some of the dried rubber in the form of dust. My invention may be availed of by passing the dust laden heated fluid through a second chamber and subject it to a spray of water which will carry the dried dust-like particles of latex with it to the floor of the receptacle and at the same time thoroughly wash the collected rubber particles thereby effecting both a saving and washing of the rubber carried by the heated medium. This washed rubber may be further treated if desired to remove the water-insoluble non-rubber constituents in a manner similar to that already described.

Materials which are ordinarily classed under the term rubber including balata, gutta percha, synthetic rubber, chicle, and the like, or mixtures of these, may be treated in a similar manner and products of similarly improved characteristics obtained when desired, and it is intended to include any such suitable substance or substances by the term rubber in the foregoing description and appended claims, unless otherwise limited.

As many apparently widely different embodiments of this invention may be made without departing from the spirit thereof, it is to be understood that I do not intend to limit myself to the specific form of the invention as set forth except as indicated in the appended claims.

Having thus described my invention what I claim and desire to protect by Letters Patent is:

1. A method of purifying rubber which comprises subjecting latex to an atomizing treatment to form dry rubber in an uncompact plastic form and subjecting the rubber while in this form to treatments adapted to remove non-rubber constituents therefrom, and recovering a purified rubber in an uncompact plastic form.

2. A method which comprises spraying latex to form dry rubber in an uncompact plastic form, and subjecting the dry rubber while in said uncompact plastic form to a washing treatment with water to remove the water-soluble non-rubber constituents.

3. A method which comprises spraying latex to form dry rubber in an uncompact plastic form, subjecting the rubber while in said uncompact form to a washing treatment with water to remove the water-soluble non-rubber constituents, and thereafter drying the rubber while in the uncompact form.

4. A method which comprises producing a spray of rubber particles and subjecting the particles while in the form of a spray to a liquid.

5. A method which comprises producing rubber in the form of a spray of falling particles, subjecting the falling rubber particles to the action of a liquid, and subjecting the fallen particles collected in an uncompact mass to the action of a liquid.

6. A method which comprises treating latex to form a spray of dry rubber, collecting said dry rubber in an uncompacted spongy form, and subjecting said dry rubber to the action of water and a reagent for rendering the protein soluble.

7. A method which comprises treating latex to form a spray of dry rubber, collecting said dry rubber in an uncompacted spongy form, and subjecting said dry rubber to the action of water and a proteolytic enzyme for changing the insoluble proteins into a soluble form.

8. A method which comprises treating latex to form a spray of dry rubber, collecting said dry rubber in an uncompacted spongy form, and subjecting said dry rubber to the action of water and papain for changing the insoluble proteins into a soluble form.

9. A method of producing a pure rubber which comprises disposing latex into a spray of dry particles, collecting the particles in an uncompact spongy form and subjecting said uncompact spongy rubber to the action of solvents for the water insoluble non-rubber constituents.

10. Transforming latex into a spray of dry particles, collecting said particles in an uncompact spongy form, and while in this form subjecting the rubber to a washing treatment with water to remove the water-soluble non-rubber constituents, and treating the uncompact mass to the action of solvents to remove the water insoluble non-rubber constituents.

11. A method for producing pure rubber which comprises atomizing latex into a drying atmosphere, collecting the dried particles in an uncompact spongy form, and subjecting the rubber while in said form to a washing treatment with water to remove the water-soluble non-rubber constituents, treating the uncompact mass to the action of water and a reagent for rendering the said protein soluble, and treating the uncompact mass to the action of a solvent for the resin.

12. A method for producing pure rubber which comprises atomizing latex into a drying atmosphere, collecting the dried particles in an uncompact spongy form, and subjecting the rubber while in said form to a washing treatment with water to remove the water-soluble non-rubber constituents, treating the uncompact mass to the action of water and papain for rendering the said protein soluble, and treating the uncompact mass to the action of acetone for removing the resin.

Signed at New York city, in the county of New York, and State of New York, this 18th day of June, 1924.

JAMES H. REEL.